United States Patent [19]

Ogawa et al.

[11] 4,280,761
[45] Jul. 28, 1981

[54] ELECTROMAGNETIC SHUTTER DRIVING CIRCUIT

[75] Inventors: Yukio Ogawa, Kawasaki; Ryoichi Suzuki, Yokohama; Takao Kinoshita, Tokyo; Takashi Uchiyama, Yokohama, all of Japan

[73] Assignee: Canon Kabushiki Kaisha, Tokyo, Japan

[21] Appl. No.: 47,116

[22] Filed: Jun. 11, 1979

[30] Foreign Application Priority Data

Jun. 16, 1978 [JP] Japan .................................. 53-73040

[51] Int. Cl.³ ...................... G03B 7/097; H01H 47/00
[52] U.S. Cl. ........................................ 354/29; 354/50; 354/60 R; 354/235; 361/152
[58] Field of Search ...................... 354/29, 30, 50, 51, 354/60 R, 234, 235; 361/152

[56] References Cited

U.S. PATENT DOCUMENTS 4,104,666   8/1978   Toyoda et al. ...................... 354/234

Primary Examiner—Michael L. Gellner

[57] ABSTRACT

In the disclosed circuit, an electromagnetically driven shutter is opened and closed by an electromagnetic drive device. A detector senses the current through or the voltage across an exciting member of the electromagnetic drive. A drive circuit is controlled by a comparator which compares the output of a constant voltage source with the output of the detector. The drive circuit is regulated so that when the shutter is opened and closed, the current is maintained at predetermined values so as to always keep the shutter characteristics constant.

5 Claims, 7 Drawing Figures

ELECTROMAGNETIC SHUTTER DRIVING CIRCUIT

The present invention relates to a camera shutter, and in particular, a driving circuit for electromagnetically driving a shutter whose exposure time and aperture value are determined in accordance with the brightness of the object to be photographed. In such shutters, the blades open at a comparatively low speed and close at a high speed as soon as a total exposure corresponding to the brightness has been reached. When the opening and closing of the blades is driven by means of a movable coil type electromagnetic device, operation of the blades can be carried out simply by switching the polarity of the current running through the coil. This results in a simple mechanism.

However, if the voltage to be applied to the electromagnetic device is altered due to consumption of the power source, etc. and the driving speed of the shutter blades deviates from the determined value, a correct exposure is not obtained.

The interval between which the shutter blades start to open and start to close is controlled by means of a time constant circuit in accordance with the brightness of the object. If the opening speed of the shutter blades is lower than a predetermined value, the desired determined aperture value has not yet been reached when the shutter blades start to close, and the exposure is inadequate.

Moreover, in such a construction where a subsidiary aperture operatively engaged with the shutter blades is provided, light reflected by the object through the subsidiary aperture is sensed by means of a light sensing element of the light measuring circuit. As soon as the light incident upon the sensing element has reached a predetermined value the opening operation of the shutter blades is switched into a closing operation. Because there is a time lag between the signal produced by the light measuring circuit and switching from the opening operation of the shutter blade to closing, it is necessary to compensate for the shape of the subsidiary aperture. This helps to obtain an accurate exposure. In consequence, the dimension of the main aperture does not correspond to that of the subsidiary aperture. Compensation is made assuming that the opening and closing of the shutter blades would be operated at a constant speed. An accurate exposure can not be obtained when the moving speed of the shutter blades is altered due to the alteration of the voltage and so on.

A purpose of the present invention is to eliminate the aforementioned shortcoming and more particularly to offer a circuit for driving an electromagnetically driven shutter at a constant speed.

The present invention is explained below in accordance with the accompanying drawings, wherein.

Figure 1:
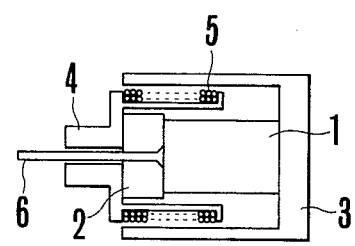
FIG. 1 shows an embodiment of the movable coil type electromagnetic drive mechanism.

In the drawings, a permanent magnet 1 is secured within a yoke 3. In the gap formed between the pole piece 2, and the yoke 3, a magnetic flux is produced by the permanent magnet 1. A movable coil 5 provided on a cylindrical bobbin 4 is arranged in the gap. A guide shaft 6 is secured on the center shaft of the permanent magnet 1. Depending on the direction of the current running through the movable coil 5, the coil bobbin 4 performs a straight reciprocal motion along the guide shaft 6. This motion is mechanically utilized to cause the shutter blades.

Figure 2:
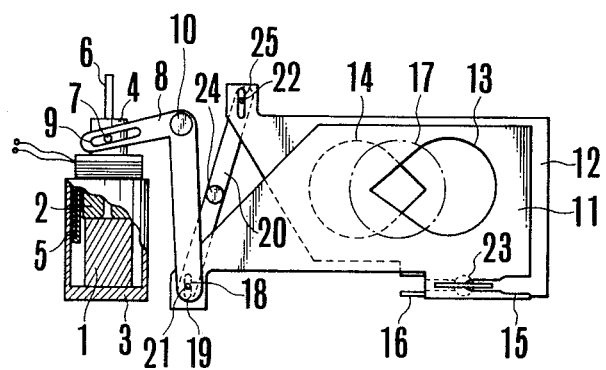
FIG. 2 is an embodiment of the electromagnetic shutter in which the electromagnetic drive mechanism of FIG. 1 is shown in elevation.

FIG. 2 shows an embodiment of a half open type electromagnetic shutter in which an electromagnetic mechanism, as shown in FIG. 1, is used. In the drawing, numerals 1 to 6 designate the same elements as those in FIG. 1. A pin 7 is secured outside of the bobbin 4, and a driving lever 8 engages with the pin 7 by means of a long groove 9. The driving lever 8 is rotatable around a support shaft 10 along with the straight up and down motion of the bobbin 7. A pin 18 is secured on the long arm of the driving lever 8, and is slidably engaged in a long groove 19 of a first shutter blade 11, and also with a lower long groove 21 of an operatively engaged lever 20. The lever 20 rotates around the support shaft 24, and is slidably engaged in the long grooves 21 and 25 of first and second shutter blades 11 and 12, respectively by means of pins 18 and 22. At the center of the first shutter blade 11 and the second shutter blade 12, main openings 13 and 14 are formed, while subsidiary openings 15 and 16 for light measurement are formed near the edges of blades 11 and 12. The shutter shown in FIG. 2 operates so that when the bobbin 4 is moved upwardly the driving lever 8 rotates around the support shaft in a clockwise direction. In operative engagement with this rotation, the lever 20 is also rotated clockwise around a support shaft 24. Thus, the first shutter blade 11 is moved to the left, while the second one 12 is moved to the right. With movement of the two shutter blades a main aperture 17 and a subsidiary aperture 23 are opened, so that the main openings 13 and 14 and the subsidiary openings 15 and 16 are opened in synchronism with each other. The exposure time is determined by the light incident upon a light sensing element, not shown, through the subsidiary openings 15 and 16. The polarity of the current supplied to the movable coil 5 of the electromagnetic mechanism is reversed by the reversing signal of the circuit so as to drive the bobbin 4 downwards. Thus, contrary to the aforementioned operation the driving lever 8 and the operatively engaged lever 20 are driven to move the first shutter blade 11 to the right and the second shutter blade 12 to the left so that the main aperture 17 and the subsidiary aperture 23 are closed in synchronism with each other by means of the main and subsidiary openings.

Figure 3:
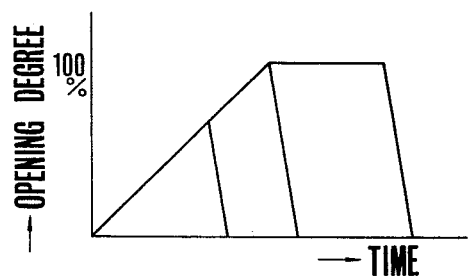
FIG. 3 is an example of the opening and closing characteristic curve of the half open type shutter.

FIG. 3 shows an embodiment of the opening and the closing time characteristics of the half open type shutter. This shutter is opened more slowly as it is closed and it is closed as quickly as possible. It is important that such a characteristics have a superior reproducibility; if the characteristic curve changes, the proper exposure control is not obtained. In the half opened type shutter driven by the electromagnetic driving mechanism, the driving power of the shutter blades depends upon the electric power supplied to the coil. It is thus essential to keep this power constant. In the automatic exposure control camera, when the light measuring system is external, the exposure time is determined by means of the time constant of the light sensing element and the condenser, so that the opening and closing of the shutter with a constant characteristic curve is compensated. When the shutter opening speed slows down, the trigger circuit is inverted before the shutter opening has assumed the proper aperture value, and the amount of light passing through the main aperture of the shutter blade becomes too small for proper exposure. On the other hand, when the shutter closing speed slows down, the incident light through the main aperture increases after the inversing signal is applied to the exposure control circuit, and an overexposure results.

In the light measuring system using a subsidiary aperture, opening and the closing of the main aperture is synchronized with those of the subsidiary aperture. The reversing signal is produced when the incident light through the subsidiary aperture reaches a predetermined time. In this light measuring system, the total light passing through the main aperture of the half open type shutter is taken into consideration, to determine the shape of the subsidiary opening necessary for obtaining an exact exposure time.

If the speed of the shutter blade changes, however, no proper exposure can be obtained.

Figure 4:
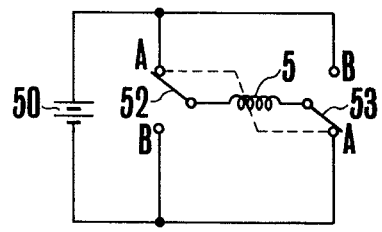
FIG. 4 is a circuit diagram explaining the principle of the conventional electromagnetic shutter.

FIG. 4 is a circuit diagram of the conventional circuit which drives the shutter driving electromagnetic mechanism. The voltage of a power source 50 is applied to both terminals of a coil 5 of the electromagnetic mechanism. Two gauged switches 52 and 53 at both ends of the coil 5 are switched to either the A contact or the B contact to reverse the polarity of the exciting current for the coil 5. When an electromagnetic mechanism as shown is built into a camera, the voltage at both terminals of the power source is lowered due to energy consumption, for example, the exciting current for the coil 5 is decreased. Thus the electromagnetic force working upon the bobbin, namely the driving power of the shutter blades is decreased and. Proper the shutter opening and closing speed is lowered, exposure control is therefore not obtained. This is inconvenient.

Figure 5:
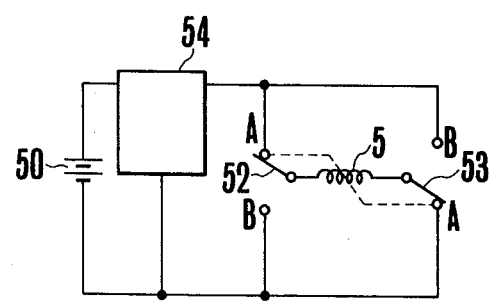
FIG. 5 is a circuit diagram for explaining the principle of the electromagnetic shutter in accordance with the present invention.

In order to overcome the aforementioned inconvenience in accordance wih the present invention, the structure is constructed so that the power supply to the electromagnetic mechanism—time characteristics could not always be varied so as to obtain a good reproductivity of the shutter opening and closing curve in order to always obtain a proper exposure. Namely, in the present invention, as shown by the circuit diagram in FIG. 5, a certain constant power is always supplied to the coil 5 of the electromagnetic mechanism through a constant voltage or a constant current circuit 54 so as to improve the reproductivity of the shutter opening and closing curve.

Figure 6:
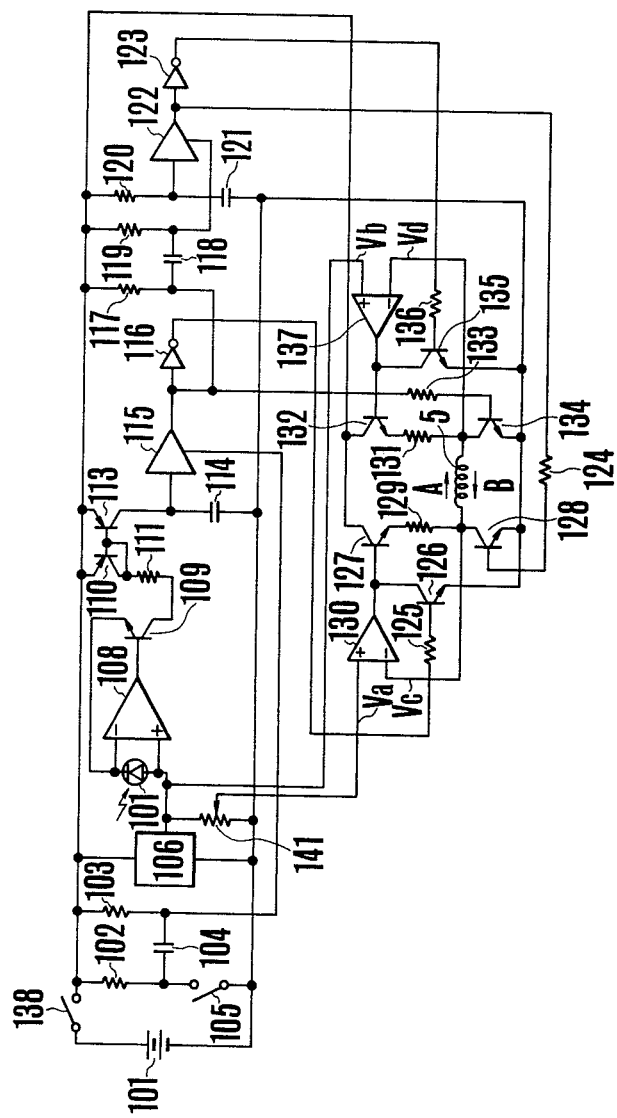
FIG. 6 is a circuit diagram of an embodiment of the electromagnetic shutter in accordance with the present invention.

FIG. 6 is a circuit diagram of an embodiment of the driving circuit of the electromagnetic shutter in accordance with the present invention. In the drawing, numeral 101 designates a power source, 138 designates a main switch and numeral 105, a shutter release switch. Members 138 and 105 are normally opened. Resistors 102 and 103 and a condenser or capacitor 104 constitute a differentiating circuit which produces a differentiated pulse when the switches 138 and 105 are closed. When a timer circuit 115 is closed with the pulse signal, its output is changed from a low level (L) to a high level (H) as to bring into the closed state the transistor 134 of the transistor bridge circuit for actuating the coil 5 of the electromagnetic mechanism. Further, the inverter produces a "L" output so that the transistor 126 is turned off. Along with the opening i.e., turning off of the transistor 126, the transistor 127 of a bridge circuit is closed, i.e., turned on. At this instant, a second differentiating circuit formed by resistors 117, 119 and a condenser or capacitor 118 has not yet produced a differentiated pulse so that a timer circuit 122 produces an "L" or low output. Therefore, an transistor 128 of the bridge circuit is turned off. Further, an inverter 123 produces a "H" or high output, so that transistor 135 is closed or on while the transistor 132 of the bridge circuit is opened or off. That is, the transistors 127 and 134 are closed or, on while the transistors 128 and 132 are opened in the transistor bridge circuit, and an exciting current from the power source flows through the transistor 127, the resistance 129, the coil 5, and through the transistor 134 along the direction of the arrow A. Thus, the shutter blades 11 and 12 are driven so as to totally open the shutter by means of the electromagnetic mechanism. At the same time, the subsidiary opening is also opened so that light is incident upon the light sensing element 101 (for example SPC). An output corresponding to this incident light is produced through an operational amplifier 108 so as to charge a timing condenser or capacitor 114. As soon as the voltage of the capacitor 114 becomes higher than the threshold level of the timer circuit 115, the output of the circuit 115 changes from "H" to "L". The transistors in the transistor bridge circuit are then controlled contrary to the above mentioned state, namely the transistor 134 is opened i.e., turned off, and the transistor 126 is closed (on) while the transistor 127 is opened. At this instant the output of the timer circuit 122 is inverted from "L" to "H" by means of the pulse signal from the second differentiating circuit. The transistor 128 is turned on and the transistor 135 is turned off so that the transistor 132 is turned on. Thus, the excitation current to the coil 5 of the electromagnetic mechanism flows along the direction of the arrow B, driving the shutter blades 11, 12 into the closed position.

In the circuit shown in FIG. 6, when the shutter is opened, the standard voltage Va which is the output of a constant voltage circuit 106 divided by a variable resistance 141 is supplied to the (+) input of a comparator 130. Meanwhile, the voltage Vc of the coil 5 of the electromagnetic mechanism is compared with the (−) input of the comparator 130 so that the transistor 127 of the bridge circuit is controlled by the output of the comparator 130. Thus, transistor 127 always applies a constant voltage to the coil 5. When the shutter is closed, the output Vb of the constant voltage circuit 106 is applied to the (+) input of the comparator 137, and is compared with the (−) input of the voltage of the coil 5. In such a manner, the transistor 132 is controlled by the output of the comparator 137 so as to always deliver a constant voltage to the coil 5. The constant voltage when the shutter is closed is chosen to be higher than that when the shutter is opened therefore maintaining the shutter operation characteristics. Specifically, in the embodiment shown in FIG. 6, the two standard voltages Va and Vb from the constant voltage circuit cause the voltage applied to the coil 5 to be controlled so they are Vc when the shutter is opened and Vd when the shutter is closed, so as to keep the shutter operation characteristics unchanged. When the impedance of the coil 5 is changed due to the influence of temperature, humidity, etc. the exciting current running through the coil 5 changes, and a danger exists in that the shutter opening and closing speed may be changed and an exact exposure control could not be obtained.

Figure 7:
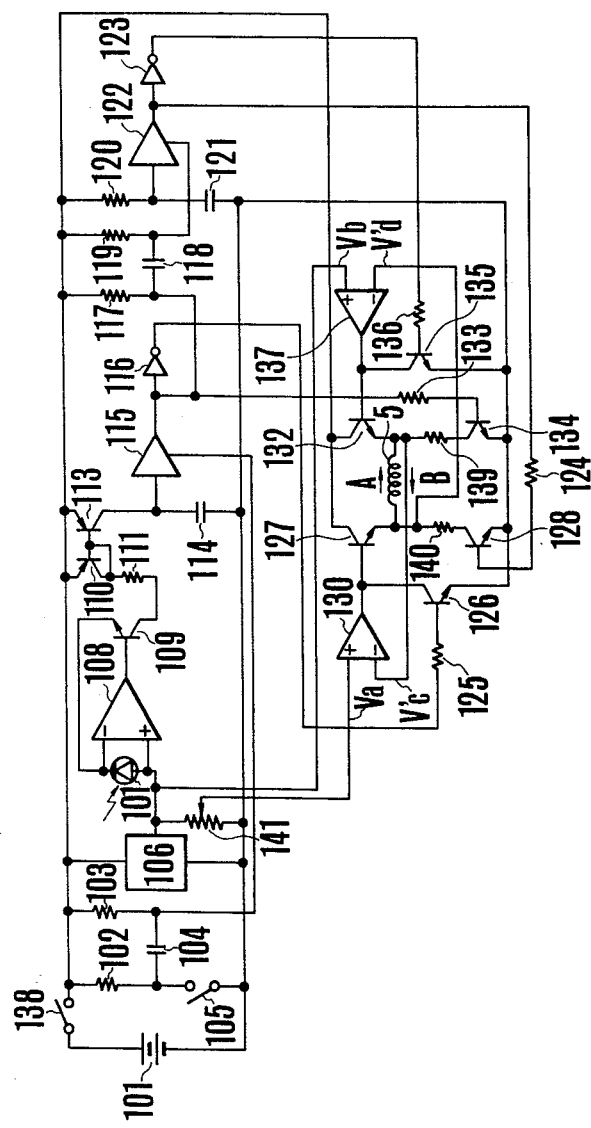
FIG. 7 is a circuit diagram of another embodiment in accordance with the present invention.

FIG. 7 shows another embodiment, from which the shortcomings of the circuit shown in FIG. 6 are excluded. The numerals designate the same elements as those in FIG. 6. In the circuit shown in the drawing, when the shutter is opened the output voltage Va divided by the constant voltage circuit 106 is compared by the comparator 130 with the voltage Vc' produced between a resistor 139 connected in parallel to one side of the bridge circuit and the output resistance of the transistor 134. The transistor 127 is controlled by the output of the comparator 130 so that the current running through one side of the bridge, including this resistor 139, namely the current running through the coil 5, is constant. When the shutter is closed, the output Vb of the constant voltage circuit 106 is compared by means of a comparator 137 with the voltage Vd' produced between a resistor 140 and the output resistor of the transistor 128. The transistor 132 is controlled by means of the output of the comparator 137 so that the current running through the coil 5 is constant. In this way, the coil 5 is excited by a constant current although its impedance is somewhat changed under the influence of the temperature, the humidity and so on. Although the standard voltage Va when the shutter is opened and the voltage Vb when the shutter is closed are changed by dividing the output of the circuit 106, the same effect can be obtained if the value of the resistor 140 in the bridge circuit is chosen to be lower than that of the resistor 139.

In every embodiment mentioned above, a constant voltage circuit or constant current source is used as a power supply for the electromagnetic driving mechanism of the shutter blades. Such a circuit is not limited to that of the embodiment shown; any circuit will suffice in which the characteristic voltage curve or current supplied to the coil of the electromagnetic driving mechanism with reference to time, is always constant. Further, in an electromagnetic driving device, types not using the movable coil type will also suffice.

In the aforementioned embodiment, the driving circuit in accordance with the present invention is applied to the half open type shutter. The present invention is not limited to the above but can be applied to the conventional totally open type shutter.

Regardless of the kind of shutter used, the application of the driving circuit in accordance with the present invention improves the reproducibility of the characteristics so as to obtain an accurate shutter operation, which is remarkably profitable.

What is claimed is:

1. A circuit for electromagnetically driving the shutter blades of a shutter for an exposure, comprising:
   an electromagnetic driving device including a coil;
   a control circuit for supplying a current to the coil;
   constant means for maintaining a constant electric value;
   detecting means for detecting an electric value at the coil; and
   comparison means for comparing the output of the constant means with that of the detecting means;
   said comparison means being coupled to the control circuit for controlling the electric value to be supplied to the coil and keep the value constant.

2. A circuit for electromagnetically driving the shutter blades of a shutter for an exposure, comprising:
   an electromagnetic driving device including a coil;
   a control circuit for supplying a current to the coil;
   light measuring means for measuring the brightness of an object and for producing a signal corresponding to the measured light value;
   inverting means for inverting the polarity of the current to be supplied to the coil in accordance with the output of the light measuring means;
   constant means for maintaining a constant electric value;
   detecting means for detecting an electric value at the coil; and
   comparison means for comparing the output of the constant means with that of the detecting means;
   said comparison means being coupled to the control circuit for controlling the electric value to be supplied to the coil and keeping the electric value constant.

3. A circuit in accordance with claim 2, further comprising switchover means for causing the control circuit to supply current to the coil in the forward direction so as to open the shutter and a current to the coil in the reverse direction so as to close the shutter.

4. A circuit in accordance with claim 3, wherein the control circuit is arranged for supplying a larger current in the backward direction to the coil than that in the forward direction so as to close the shutter.

5. A circuit in accordance with claim 2, wherein the light measuring means are arranged for measuring the light of the object through a subsidiary aperture operatively connected to the shutter blades.

* * * * *